(12) United States Patent
Thornton et al.

(10) Patent No.: US 10,294,872 B2
(45) Date of Patent: May 21, 2019

(54) SUN GEAR DRIVE ARRANGEMENT

(71) Applicant: ROLLS-ROYCE plc, London (GB)

(72) Inventors: Stewart T. Thornton, Derby (GB); Andrew Swift, Derby (GB)

(73) Assignee: Rolls-Royce plc, London (GB)

( * ) Notice: Subject to any disclaimer, the term of this patent is extended or adjusted under 35 U.S.C. 154(b) by 162 days.

(21) Appl. No.: 15/661,458

(22) Filed: Jul. 27, 2017

(65) Prior Publication Data
US 2018/0030901 A1 Feb. 1, 2018

(30) Foreign Application Priority Data
Jul. 28, 2016 (GB) .................................. 1613029.6

(51) Int. Cl.
F02C 7/36 (2006.01)
F16H 57/00 (2012.01)
F02K 3/06 (2006.01)
F16C 1/02 (2006.01)
F16D 3/76 (2006.01)
F16H 1/28 (2006.01)

(52) U.S. Cl.
CPC .................. F02C 7/36 (2013.01); F02K 3/06 (2013.01); F16C 1/02 (2013.01); F16D 3/76 (2013.01); F16H 1/28 (2013.01); F16H 57/0025 (2013.01); F05D 2240/40 (2013.01); F05D 2240/61 (2013.01); F05D 2240/62 (2013.01); F05D 2260/40311 (2013.01)

(58) Field of Classification Search
CPC .......... F02C 7/36; F16H 57/0025; F16H 1/28; F16D 3/76; F16C 1/02; F02K 3/06; F05D 2240/61; F05D 2240/40; F05D 2240/62; F05D 2260/40311
See application file for complete search history.

(56) References Cited

U.S. PATENT DOCUMENTS 7,591,754 B2    9/2009 Duong et al.
10,119,465 B2 * 11/2018 Sheridan ................. F02C 3/107
(Continued)

FOREIGN PATENT DOCUMENTS

EP    3020953    5/2016
GB     612709   11/1948

OTHER PUBLICATIONS

European Search Report dated Nov. 16, 2017, issued in EP Patent Application No. EP17178704.
(Continued)

Primary Examiner — Thomas N Moulis
(74) Attorney, Agent, or Firm — Duane Morris LLP

(57) ABSTRACT

Disclosed is a gas turbine engine comprising: a low pressure spool having a low pressure compressor and a low pressure turbine connected by a low pressure shaft; a reduction gear train having a sun gear, a carrier having a plurality of planet gears attached thereto, and a ring gear, wherein the sun gear is driveably connected to the low pressure shaft, and either of carrier and ring gear provides an output drive connected to a propulsive fan; wherein the connection between the low pressure shaft and the sun gear includes a flexible drive shaft having serially connected concentrically nested first and second input shafts between the low pressure shaft and sun gear.

19 Claims, 2 Drawing Sheets

(56) References Cited

U.S. PATENT DOCUMENTS

| | | | | |
|---|---|---|---|---|
| 2014/0155219 A1* | 6/2014 | McCune | ............... | F01D 15/12 |
| | | | | 475/331 |
| 2015/0337677 A1* | 11/2015 | Roberge | ................ | F01D 15/10 |
| | | | | 290/52 |
| 2015/0354400 A1* | 12/2015 | Teixeira | ................ | F01D 17/12 |
| | | | | 415/148 |
| 2016/0076393 A1* | 3/2016 | Sheridan | ............. | F16H 1/2809 |
| | | | | 416/170 R |
| 2016/0097331 A1* | 4/2016 | Venter | ................... | F01D 15/12 |
| | | | | 415/122.1 |
| 2017/0009776 A1* | 1/2017 | Gomanne | ............. | F01D 25/20 |
| 2017/0082065 A1* | 3/2017 | Swift | .................... | F01D 25/16 |
| 2017/0122216 A1* | 5/2017 | Kupratis | ................ | F02K 3/072 |

OTHER PUBLICATIONS

Great Britain Search Report dated Jan. 23, 2017, issued in GB Patent Application No. 1613029.6.

* cited by examiner

SUN GEAR DRIVE ARRANGEMENT

TECHNICAL FIELD OF INVENTION

This invention relates to an input drive shaft for a geared turbo fan power gearbox.

BACKGROUND OF INVENTION

Current trends in gas turbine engines are moving towards so-called geared turbofan engines in which the fan is driven through a reduction gear train. The gear train allows the low pressure spool to be driven at higher rotational speeds which provides for a more efficient lighter engine core, whilst reducing the speed of the fan allows it to be a larger diameter thereby providing a higher bypass ratio. The reduction gear trains may be epicyclically configured where the fan is driven via the carrier of a planetary configuration, or a star configuration where the planet gears are fixed and the fan shaft is driven by the ring or star gear. The gear train may be a compound configuration as known in the art.

However, the introduction of the reduction gearing in large gas turbine engines leads to parasitic loads which result from an accumulation build tolerances and thermo-mechanical movement in service. The parasitic loads can result in significant deleterious loading and wear on the gears. For example, the drive shaft can suffer from yaw and pitch couples and radial loads which are placed on a sun gear and cause significant additional heat generation and wear in large gas turbine engines.

This is recognised partially in U.S. Pat. No. 7,591,754 which describes a coupling system for connecting the sun gear to a shaft within a planetary gear train. The sun gear coupling has an undulating flexible section joined to an inflexible spindle for accommodating misalignment between the sun gear and the drive shaft. The flexible section comprises a cylindrical ring having a diameter greater than the diameter of the spindle, and joined to the spindle by two longitudinally spaced apart diaphragms.

The present invention seeks to provide an improved drive for the sun gear of a gas turbine engine power gearbox.

STATEMENTS OF INVENTION

The present invention provides a gas turbine engine according to the appended claims.

Below is described a gas turbine engine, comprising: a low pressure spool having a low pressure compressor and a low pressure turbine connected by a low pressure shaft. The gas turbine may include a reduction gear train having a sun gear, a carrier having a plurality of planet gears attached thereto, and a ring gear, wherein the sun gear is driveably connected to the low pressure shaft, and either of carrier and ring gear provides an output drive connected to a propulsive fan. The connection between the low pressure shaft and the sun gear may include a flexible drive shaft having serially connected concentrically nested first and second input shaft portions between the low pressure shaft and sun gear.

Alternatively, there may be provided a gas turbine engine, comprising: a low pressure spool having a low pressure compressor and a low pressure turbine connected by a low pressure shaft; a reduction gear train having a sun gear, a carrier having a plurality of planet gears attached thereto, and a ring gear, wherein the sun gear is driveably connected to the low pressure shaft, and either of carrier and ring gear provides an output drive connected to a propulsive fan; wherein the connection between the low pressure shaft and the sun gear includes a flexible drive shaft having serially connected concentrically nested first and second input shafts between the low pressure shaft and sun gear in which the first and second input shafts are connected by a first flexible coupling which is located fore of the sun gear.

A gas turbine engine, may comprise: a low pressure spool having a low pressure compressor and a low pressure turbine connected by a low pressure shaft; a reduction gear train having a sun gear, a carrier having a plurality of planet gears attached thereto, and a ring gear, wherein the sun gear is driveably connected to the low pressure shaft, and either of carrier and ring gear provides an output drive connected to a propulsive fan; wherein the connection between the low pressure shaft and the sun gear includes a flexible drive shaft which extends from aft of the sun gear, through the sun gear to a terminal end fore of the sun gear, and back on itself to a connection with the sun gear. The terminal end may be floating.

Providing flexible drive shaft in such away allows the various misalignments between the low pressure shaft and the sun gear to be accommodated in a spaciously efficient manner.

The second input shaft may extend between the first input shaft and the sun gear. The first input shaft may extend directly from the low pressure shaft, or from an intermediate or third input shaft. The first and second shafts may be connected directly together via a flexible coupling. The flexible coupling may be a diaphragm coupling. The joint between the first and second input shafts may include a plurality of flexible couplings.

The first input shaft may extend between the second input shaft and the sun gear. The second input shaft may extend between the low pressure shaft and the first input shaft. A flexible coupling may driveably couple the first and second input shafts.

A second flexible coupling may driveably couple the low pressure shaft and second input shaft.

The flexible couplings may be provided by one or more diaphragm couplings.

The first diaphragm coupling between the first and second shaft portions may be located upstream of the sun gear.

Upstream of the gearbox may be taken to be relative to the principal axis of the engine. Thus, the diaphragm coupling is fore of the gearbox. The terminal end of the gearbox may be provided by the axial extreme of the gearbox, or the axial carrier wall.

The gas turbine engine may further comprise: a fan shafting arrangement comprising a fan shaft which is connected to the output drive of the gear train and a fan support shaft which extends between the fan shaft and the low pressure turbine shaft passing through the centre of the sun gear and input shaft. The support shaft may pass through the first and second input shafts.

The support shaft may be rotatably connected to the low pressure shaft via an intershaft bearing arrangement, and second diaphragm coupling may be located upstream of the intershaft bearing arrangement.

The fan shafting arrangement may further include a drive arm which connects the fan shaft to the carrier, the first diaphragm coupling being located radially within the drive arm.

The second diaphragm coupling may be located downstream of the gearbox. The gearbox may be enclosed within a housing having upstream and downstream walls. Each of the upstream and downstream walls may include bearings which engage with and provide rotational support planet carrier. The first diaphragm coupling may be upstream of the housing. The second diaphragm coupling may be downstream of the housing.

The second diaphragm coupling may be located upstream of the first compressor rotor of the low pressure compressor The compressor is taken to be that of the axial compressor located within the engine core and downstream of the fan. Such compressors typically include an assembly of rotor and stator pairs arranged in axial series. The rotors of the axial compressor typically form a rotor drum to which the compressor blades are mounted.

The fan shafting arrangement may be supported by at least two axially separated bearings, a first bearing being located upstream of the first diaphragm coupling, the second bearing being located downstream of the second diaphragm coupling.

The drive arm may include a coupling having a radially expanded portion in which the second diaphragm coupling is located.

Within the scope of this application it is expressly envisaged that the various aspects, examples and alternatives, and in particular the individual features thereof, set out in the preceding paragraphs, in the claims and/or in the following description and drawings, may be taken independently or in any combination where technically compatible, unless otherwise stated.

DESCRIPTION OF DRAWINGS

Embodiments of the invention will now be described with the aid of the following drawings of which.

DETAILED DESCRIPTION OF INVENTION

Figure 1:
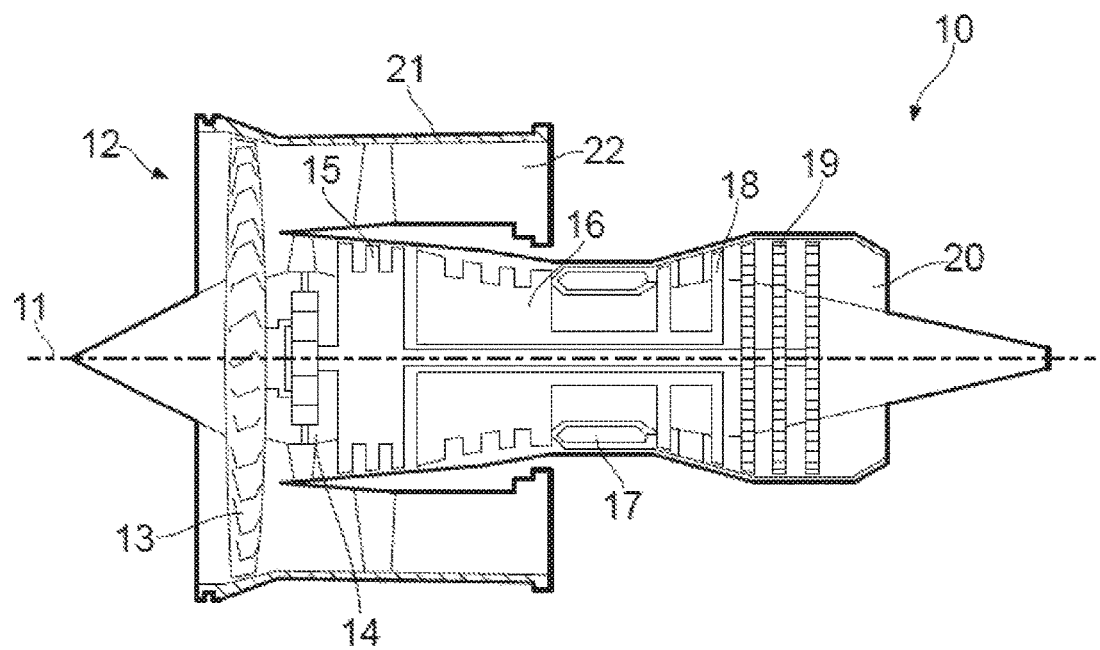
FIG. 1 shows a schematic section of a geared turbo fan arrangement.

FIG. 1 shows a geared gas turbine engine 10 having a principal axis of rotation 11 and, in axial flow series, a fan 12, a gear train 14, a low pressure compressor 15, a high pressure compressor 16, a combustor 17, a high pressure turbine 18 and a low pressure turbine 19. Interconnecting shafts drivable connect the low pressure compressor and low pressure turbine, and the high pressure compressor and high pressure turbine.

The low 15 and high 16 pressure compressors progressively compress air from an inlet downstream of a fan 12 to an outlet in flow proximity to the combustor 17. Compressed air flows from the high pressure compressor 18 into the combustor 17 where fuel is added and the mixture burnt. The combusted gas expands through and drives the high 18 and low 19 pressure turbines in flow series before being exhausted from the core nozzle 20.

The fan 12 is located at the front of the engine to provide air for the inlet of the compressors and the main propulsive flow which is channelled down the bypass duct 21. The fan is driveably connected to the low pressure shaft via the gear train 14 which is in the form of an epicyclic reduction gear box.

The gear train is located between the low pressure shaft and the fan 12 and is arranged to reduce the speed of the fan 12 relative to the speed of the low pressure turbine 19 and compressor 15. Such an arrangement allows for a higher speed and more efficient low pressure turbine 19 together with a larger, slower fan which can provide a higher bypass ratio. In other words, the presence of the gear train 14 allows the speed of the fan 12 and low pressure turbine 19 to be independently optimised.

The fan 12 has a plurality fan blades 13 extending radially from a hub which is mounted so as to rotate about the principal axis of the engine. The fan resides within a fan casing 21 which partially defines the bypass duct 22. An engine casing surrounds the engine core which comprises the low and high pressure spools and combustor. The engine casing generally provides containment and structural support for the engine core and is ultimately attached to and supported by the wing of the aircraft via an appropriate arrangement of struts as is well known in the art.

The gear train described in this specification is in the form of an epicyclic reduction gearbox which is driven in a planetary configuration, however it will be appreciated that star configured gear boxes may also be considered for the invention. As is well known in the art, a planetary epicyclic gear train includes a ring or annular gear which is held substantially stationary in relation to the engine, a planet gear set with individual planets gears interconnected via a carrier which is rotatable about the principal axis, and a sun gear driveably connected to the low pressure shaft. The fan 12 is connected to the output shaft of the gear train which is in the form of the carrier of the planet gear via a fan shafting arrangement.

The epicyclic power gearbox is mounted such that the sun gear is not directly supported by bearings but floats within the carrier planet gears. This maximises the load sharing between the sun and planet gears and also helps extend the gearbox life.

A drawback of not supporting the sun gear directly with bearings is that any relative movement, for example, yaw and pitch couples or radial loads, put on the sun gear results in direct gear mesh overload and excessive wear. The sources of yaw and pitch couples and radial loads are the accumulation of component tolerances between the low pressure shaft bearing and the sun gear drive splines which attach the sun gear to the shaft. In service conditions such as thermo-mechanical deflections between the engine core and gear box can also result in significant movement. This is a particularly significant problem in larger aero engines because there tends to be more flexibility in the engine structure and an inherent increase in component size which leads to greater accumulation of tolerance related misalignment and thermo-mechanical movement.

One potential solution to accommodate the misalignment and loading issue is to use articulating splines to connect the low pressure drive shaft to the sun gear. However, such articulating splines will generally impart a moment onto the sun gear from friction due to the co-axial shaft torque as it articulates as a result of misalignment. This leads to excessive and usually unacceptable gear mesh overload, particularly in large gas turbine engines. Another solution is to use known diaphragm or Bendix couplings, or undulations as per U.S. Pat. No. 7,591,754. However, these typically require a large amount of axial separation or large diameter couplings to accommodate the necessary misalignment.

Diaphragm couplings involve providing one or more pairs of diaphragms or large radius flanges along a shaft and their design considerations are well understood in the art. Hence, it is known that the amount of flexibility provided by such a coupling is at least in part determined by the size of the diaphragms and the axial separation between them. It will be appreciated that other known couplings may be used in place of diaphragm couplings. For example, more conventional flanges may be employed where the conditions allow.

In the case of a gas turbine engine, the use of diaphragm couplings is generally not considered practical because of the required spacing between the sun gear and the low pressure shaft. That is, a large separation between diaphragms would require either the gearbox to be moved forward resulting in a general elongation of the engine, or the compressor to be made radially larger to accommodate the diaphragm further downstream within the engine core. Both of these solutions therefore detract from the overall design of the engine. Equally, trying to accommodate larger diaphragms closer together would necessitate an increase in the engine core diameter to accommodate the diaphragms. So the straightforward implementation of known diaphragm, or Bendix, couplings would result in a prohibitively large and undesirable engine.

Figure 2:
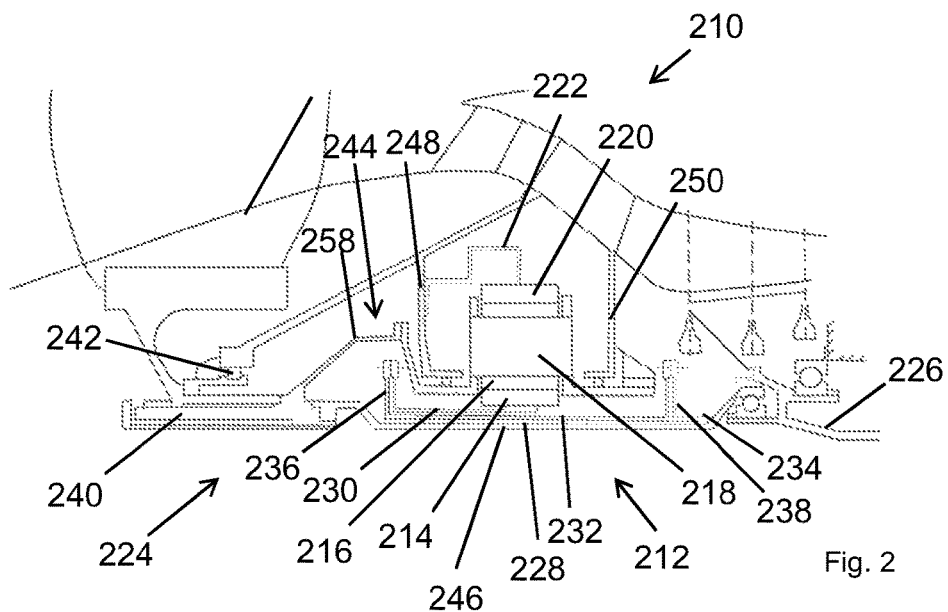
FIG. 2 shows a partial section of a geared turbo fan shafting arrangement.

FIG. 2 shows a partial longitudinal schematic representation of a geared turbofan engine 210 including a gear train 212 and surrounding architecture. The gear train 212 is an epicyclic reduction gearbox having a sun gear 214, planet gears 216, which are rotatably interconnected by a carrier 218 which is itself rotatable about the principal axis of the engine, and a ring gear 220 which is secured to the engine structure via a ring gear support arm 222. The gear train output is provided by the planet gears 216 and carrier 218 which are connected to a fan shafting arrangement 224. The input is provided by the low pressure shaft 226 which is connected to the sun gear 214 and driven by the low pressure turbine (not shown).

The input drive shaft 228 which extends between the sun gear 214 and low pressure turbine may include separate input shafts which are serially connected to provide a flexible drive shaft. In the example of FIG. 2, there are three separate input shafts which extend between the low pressure turbine shaft and the sun gear 214 to provide the flexible drive shaft. The first input shaft 230 extends from the sun gear 214 to the second input shaft 232. A third input shaft 234 extends from the second input shaft 232 to the low pressure shaft.

The second input shaft 232 extends through the centre of the sun gear 214 so as to have a terminal end on either side thereof. The first input shaft 230 and the second input shaft 232 are concentrically nested such that the second input shaft 232 is located radially within the first input shaft 230. Hence, an upstream end of the second input shaft 232 is joined to and may be coterminous with the first input shaft 230 fore of the sun gear 214. On the downstream side, or aft, of the sun gear 214 there is located a connection between the second and third input drive shaft 234.

The arrangement of the first 230 and second 232 input shafts is such that they are serially connected but double back on themselves to provide the input drive with a cantilevered or floating portion. Thus, there is a through and back shaft arrangement in which the length of the input drive is considerably longer than the axial extent of the shaft. Thus, the separation of the terminal end of the low pressure shaft and the sun gear 214 is less than the axial separation of the low pressure shaft and the floating end of the input shaft, which is less than the torque transferring length of the input shaft.

The input shafts may be joined at their respective terminal ends using suitable connections which aid the flexibility of the shafts. In the example of FIG. 2, the connections are provided by flexible couplings in the form of diaphragm couplings. Thus, there is a first diaphragm coupling 236 at the upstream coterminous ends of the first 230 and second 232 input shaft, and a second diaphragm coupling 238 at the downstream end of the second input shaft 232 where it joins to the third input shaft 234 (or low pressure shaft as the case may be).

The additional torque transferring length provided by the serially connected but nested portions of the input drive allows room for the separation of the first and second flexible couplings and an increase in the inherent flexibility of the arrangement whilst not relying on an increase in the radial dimension of the flexible couplings.

Diaphragm couplings are generally well known in the art and allow for the misalignment of shafts. They comprise one or more pair of flanged connections which are axially separated by a coupling portion or connecting shaft, which in this case is the second input shaft 232. Thus, each of the coterminous ends of the first 230 and second 232, and second 232 and third 234 input shafts include axially separated diaphragms in the form of flanges which extend radially from the respective ends of the shafts, normal to the longitudinal axis. The torque is transferred through each of the couplings via the outer diameter portions which are joined together by a suitable method such as bolting or welding. The diaphragm coupling provides for axial and radial misalignment by flexing the diaphragms.

As is well known, the flexural characteristic of a diaphragm coupling is a function of several variables including the dimensions and separation of the couplings and the materials used. The skilled person will appreciate that the specification of the flexible couplings will be application specific and require consideration of the deflections to be taken out of the input drive and the room available for accommodating the couplings.

In addition to the input drive arrangement shown in FIG. 2, the geared turbofan engine also includes a fan shaft 240; a front bearing portion 242; a drive arm 244 which is attached to the carrier 218 of the gear box and provides the drive for the fan, and a support shaft 246 which extends through the sun gear 214.

The gearbox is held within a housing defined by fore 248 and aft 250 walls which extend radially from the engine casing and terminate in bearings which engage with respective fore and aft portions of the drive arm 244.

The drive arm 244 extends along and is coaxial with the principal axis of the engine and is generally axi-symmetric. The drive arm 244 includes a coupling 258 and a carrier shaft which comprises a fore drive arm 244, the carrier 218 and an aft portion which provides rotational support to the carrier 218.

The coupling 258 extends from a first end, which is attached to the main body of the fan shaft 240, to the fore drive arm 244. The attachment of the coupling 258 to the fan shaft 240 is dependent on many factors but will generally be placed at the point which minimises the radial deflections of the fan shaft 240 which are transmitted to the gearbox. The coupling 258 helps isolate the gearbox from vibration and bending moments experienced by the fan when in use. Thus, the coupling 258 is torsionally rigid but relatively flexible in the radial, yaw and pitch directions.

In the example shown, the support shaft 246 forms part of the fan shaft 240 and lies along the principle axis of the engine. The support shaft 246 passes freely through the sun gear 214 and the input drive shaft 228 so as to have no direct contact therewith. The passage through the input drive shaft 228 is such that it can be independently rotated and radially displaced relative to the sun gear 214 and gearbox. Providing the support shaft 246 through the sun gear 214 and in structural isolation from the gearbox allows the radial loading and excursions on the fan shaft 240 to be taken out of the gearbox, simplifying the mechanical requirements of the gearbox.

A first end of the support shaft 246 is located fore of the gearbox and is attached to a downstream end of the fan shaft 240, aft of the radially extending drive arm 244. A second end of the support shaft 246 is located on the downstream side of the gear train 212 and terminates in the aft bearing which in the described example is an intershaft bearing arrangement. The intershaft bearing arrangement resides between and allows relative rotation of the low pressure shaft and the support shaft 246 whilst providing radial and axial restraint. The intershaft bearing arrangement includes an inner race, an outer race and a plurality of rolling elements in the form of ball bearings. Hence, the intershaft bearing is a thrust bearing and provides axial restraint of the fan shafting arrangement.

The location of the upstream flexible coupling 236 is within the drive arm 244 which extends between the carrier 218 and the fan shaft 240. The flexible coupling may be conveniently placed within the coupling 258 which includes an expanded radius section relative to the shaft. The downstream flexible coupling may be located upstream of the intershaft support shaft bearing and may also be upstream of the axial compressor. It will be appreciated that by axial compressor, it is meant the compressor which forms part of the engine core, rather than including the fan. Thus, the compressor may be one having several vane-blade stages in which the bladed rotors are formed as unitary piece in the form of a drum. Hence, the second or downstream flexible coupling may be upstream of the compressor rotor drum.

It will be appreciated from known flexible coupling architectures that there may be numerous co-located couplings on either end of the coupling or second input shaft 232. Further, there may be only two input shafts which extend from the low pressure shaft to the sun gear 214. Further still, where the two input shafts are formed as a unitary body, there will still be considered to be two or more input shaft portions due to the presence of the upstream flexible coupling.

The above described reduction gears are in the form of epicyclic gearboxes in which the fan is driven via the carrier 218 of a planetary configuration. However, it will be appreciated that the reduction gear could be a star configuration in which the planet gears 216 are fixed, or a compound arrangement. These different configurations are well known in the art.

Figure 3:
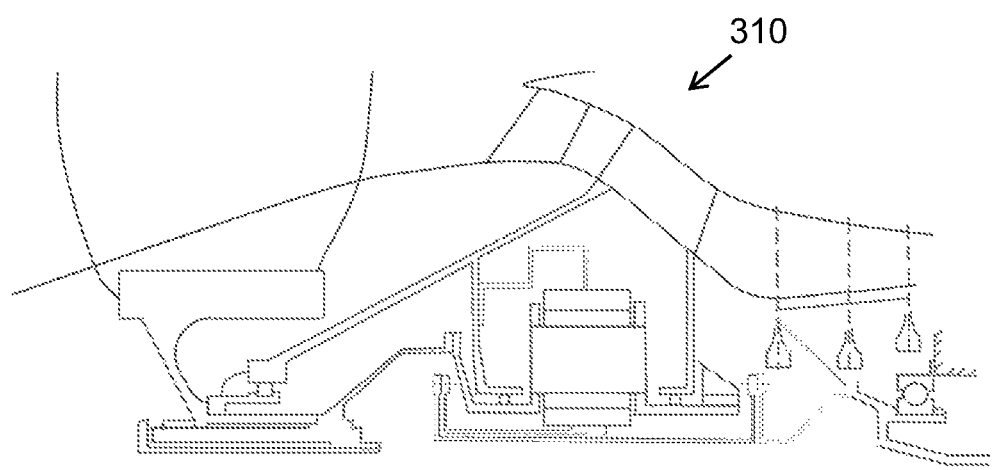
FIG. 3 shows an alternative arrangement of a geared turbo fan shafting arrangement.

FIG. 3 shows an alternative arrangement 310 which is substantially the same as that shown in FIG. 2, but with the support shaft 246 omitted.

The above described examples include a low pressure spool having a low pressure turbine, a low pressure shaft and a low pressure compressor. It will be appreciated that the low pressure spool is considered low pressure in relation to the high pressure spool and could be an intermediate pressure spool in some instances. One example of this might be where the fan is taken to be a low pressure compressor in its own right.

It will be understood that the invention is not limited to the described examples and embodiments and various modifications and improvements can be made without departing from the concepts described herein and the scope of the claims. Except where mutually exclusive, any of the features may be employed separately or in combination with any other features and the disclosure extends to and includes all combinations and sub-combinations of one or more described features.

The invention claimed is:

1. A gas turbine engine, comprising:
a low pressure spool having a low pressure compressor and a low pressure turbine connected by a low pressure shaft;
a reduction gear train having a sun gear, a carrier having a plurality of planet gears attached thereto, and a ring gear, wherein the sun gear is driveably connected to the low pressure shaft, and either of carrier and ring gear provides an output drive connected to a propulsive fan;
wherein the connection between the low pressure shaft and the sun gear includes a flexible drive shaft having serially connected concentrically nested first and second input shafts between the low pressure shaft and sun gear.

2. A gas turbine engine as claimed in claim 1, wherein the first input shaft extends between the second input shaft and the sun gear and the second input shaft extends between the low pressure shaft and the first input shaft, and wherein a first flexible coupling driveably couples the first and second input shafts.

3. A gas turbine engine as claimed in claim 2, wherein a second flexible coupling driveably couples the low pressure shaft and the second input shaft.

4. A gas turbine engine as claimed in claims 2, wherein the first flexible coupling is provided by one or more diaphragm couplings.

5. A gas turbine engine as claimed in claim 2, wherein the first flexible coupling between the first and second input shafts is located upstream of the sun gear.

6. A gas turbine engine as claimed in claim 1, further comprising: a fan shafting arrangement comprising a fan shaft which is connected to the output drive of the reduction gear train and a fan support shaft which extends between the fan shaft and the low pressure shaft passing through the centre of the sun gear and flexible drive shaft.

7. A gas turbine engine as claimed in claim 6, further comprising a second flexible coupling which driveably couples the low pressure shaft and the second input shaft, wherein the fan support shaft is rotatably connected to the low pressure shaft via an intershaft bearing arrangement, and the second flexible coupling is located upstream of the intershaft bearing arrangement.

8. A gas turbine engine as claimed in claim 6, wherein the fan shafting arrangement further includes a drive arm which connects the fan shaft to the carrier, the first flexible coupling being located radially within the drive arm.

9. A gas turbine engine as claimed in claim 3, wherein the second flexible coupling is located downstream of the reduction gear train.

10. A gas turbine engine as claimed in claim 3, wherein the second flexible coupling is located upstream of a first compressor rotor of the low pressure compressor.

11. A gas turbine engine as claimed in claim 6, wherein the fan shafting arrangement is supported by at least two axially separated bearings in which a first bearing is located upstream of the first flexible coupling and second bearing is located downstream of the second flexible coupling.

12. A gas turbine engine as claimed in claim 8, wherein the drive arm includes an output coupling having a radially expanded portion in which the first flexible coupling is located.

13. A gas turbine as claimed in claim 3, wherein the input shaft includes a plurality of first or second flexible couplings.

14. A gas turbine engine as claimed in claim 1, wherein the second end of the second input shaft is connected to the sun gear via a spline.

15. A gas turbine engine as claimed in claim 1, wherein the second end of the second input shaft is welded to the sun gear.

16. A gas turbine engine, comprising:
- a low pressure spool having a low pressure compressor and a low pressure turbine connected by a low pressure shaft;
- a reduction gear train having a sun gear, a carrier having a plurality of planet gears attached thereto, and a ring gear, wherein the sun gear is driveably connected to the low pressure shaft, and either of carrier and ring gear provides an output drive connected to a propulsive fan;
- wherein the connection between the low pressure shaft and the sun gear includes a flexible drive shaft having serially connected concentrically nested first and second input shafts between the low pressure shaft and sun gear in which the first and second input shafts are connected by a first flexible coupling which is located fore of the sun gear.

17. A gas turbine engine as claimed in claim 16, further comprising a second flexible coupling aft of the sun gear.

18. A gas turbine engine, comprising:
- a low pressure spool having a low pressure compressor and a low pressure turbine connected by a low pressure shaft;
- a reduction gear train having a sun gear, a carrier having a plurality of planet gears attached thereto, and a ring gear, wherein the sun gear is driveably connected to the low pressure shaft, and either of carrier and ring gear provides an output drive connected to a propulsive fan;
- wherein the connection between the low pressure shaft and the sun gear includes a flexible drive shaft which extends from aft of the sun gear, through the sun gear to a terminal end fore of the sun gear, and back on itself to a connection with the sun gear.

19. A gas turbine engine as claimed in claim 18, wherein the terminal end is floating.

* * * * *